United States Patent [19]

Wilson et al.

[11] Patent Number: 4,540,508
[45] Date of Patent: Sep. 10, 1985

[54] ALKYLENE PHOSPHONIC ACID SCALE INHIBITOR COMPOSITIONS

[75] Inventors: David A. Wilson, Richwood; Druce K. Crump, Lake Jackson, both of Tex.

[73] Assignee: The Dow Chemical Company, Midland, Mich.

[21] Appl. No.: 439,964

[22] Filed: Nov. 8, 1982

[51] Int. Cl.³ .................................................. C02F 5/10
[52] U.S. Cl. ...................................... 252/180; 252/175
[58] Field of Search .................................. 252/175, 180

[56] References Cited

U.S. PATENT DOCUMENTS

| | | | |
|---|---|---|---|
| 2,599,807 | 6/1952 | Bersworth | 260/500 |
| 2,609,390 | 9/1952 | Bersworth | 260/500 |
| 3,331,773 | 7/1967 | Gunderson et al. | 210/58 |
| 3,336,221 | 8/1967 | Ralston | 210/58 |
| 3,434,969 | 3/1969 | Ralston | 210/58 |
| 3,674,804 | 7/1972 | Redmore | 260/309.6 |
| 3,720,498 | 3/1973 | Redmore | 21/2.5 |
| 3,743,603 | 7/1973 | Redmore | 252/180 |
| 3,859,211 | 1/1975 | Redmore | 210/54 |
| 3,954,761 | 5/1976 | Redmore | 260/268 K |
| 4,012,440 | 3/1977 | Quinlan | 252/180 |
| 4,051,110 | 9/1977 | Quinlan | 260/72 R |
| 4,209,398 | 6/1980 | Ii et al. | 252/180 |

FOREIGN PATENT DOCUMENTS

| | | | |
|---|---|---|---|
| 764868 | 8/1971 | Belgium | 252/180 |
| 1234320 | 6/1971 | United Kingdom | 252/180 |

OTHER PUBLICATIONS

Proc. Int. Water Conf., Eng. Soc. West PA, 41, pp. 167–174, (1980), "Toward a Better Understanding of Commercial Organophosphonates", Roderick A. Campbell.

Proc. Int. Water Conf., Eng. Soc. West PA, 39, pp. 89–99, (1978), "Scale and Deposit Control in Cooling Water Systems", Jeffrey R. Townsend, Karl W. Herman.

Hoechst Article, Title Page and pp. 4, 14, and 15.

Primary Examiner—Paul Lieberman
Assistant Examiner—Robert A. Wax
Attorney, Agent, or Firm—A. Cooper Ancona

[57] ABSTRACT

Compositions comprising methylene phosphonic acid derivatives of piperazine or aminoethylpiperazine (AEP) in combination with certain phosphonic acid derivatives of aliphatic acids or, methylene phosphonic acid derivatives of ammonia, amines and polyamines. These provide a synergistic effect with respect to the threshold activity in preventing metal ion precipitation.

11 Claims, No Drawings

ALKYLENE PHOSPHONIC ACID SCALE INHIBITOR COMPOSITIONS

BACKGROUND OF THE INVENTION

The use of methylenephosphonic acid substituted alkylene polyamines for metal ion control at less than stoichiometric amounts was suggested in a patent to Bersworth. (U.S. Pat. No. 2,609,390) in 1952. Later a water dispersible polymeric amine chelating agent which included alkylene phosphonate derivatives was indicated as having "threshold" effects in scale inhibition applications (U.S. Pat. No. 3,331,773), this term being used to describe the use of the agent in less than stoichiometric amounts. The diamine and polyamine methylenephosphonate derivatives are taught and claimed in U.S. Pat. Nos. 3,336,221 and 3,434,969, respectively. Some of the products disclosed in these two patents are available commercially and are recommended as scale inhibitors when applied in threshold amounts.

Some other patents which disclose heterocyclic nitrogen containing compounds which are useful as chelating agents and may be employed in threshold amounts are U.S. Pat. No. 3,674,804; 3,720,498; 3,743,603; 3,859,211; and 3,954,761. Some of the compounds included therein are heterocyclic compounds having the formulas:

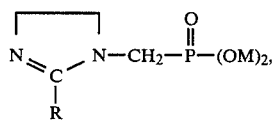

wherein R is hydrogen or alkyl and M is hydrogen, alkali metal, ammonium or a di- or triethanolamine radical;

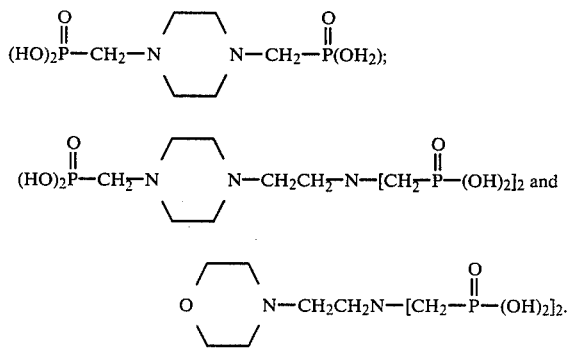

Methylenephosphonates of polyalkylene polyamines, disclosed in U.S. Pat. No. 4,051,110, are made by reacting di- or polyamines with a chain extending agent such as a dihalide or an epoxyhalide, e.g. ethylene dichloride or epichlorohydrin and thereafter, with phosphorus acid and formaldehyde. Thus, for example, triethylenetetramine is reacted with epichlorohydrin in an approximately one to one mole ratio; thereafter the product is reacted with phosphorous acid, and formaldehyde in the presence of hydrochloric acid. The resulting methylenephosphonated polyamine is useful in small amounts as a scale inhibitor, being employed at concentrations of 20–50 ppm.

Certain phosphonic acid derivatives of the aliphatic acids can be prepared by reacting phosphorous acid with acid anhydrides or acid chlorides, e.g. the anhydrides or chlorides of acetic, propionic and valeric acids. The compounds prepared having the formula

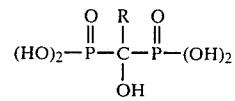

wherein R is a lower alkyl radical having 1 to 5 carbon atoms. The method of making and use of these products is described in U.S. Pat. No. 3,214,454. The use of threshold amounts to prevent calcium precipitation is disclosed and claimed therein.

SUMMARY OF THE INVENTION

It has now been found that a particular group of methylene phosphonic acid derivatives of piperazine and aminoethylpiperazine (AEP) when employed in combination with certain phosphonic acid derivatives of aliphatic acids and methylene phosphonic acid derivatives of ammonia, amines and polyamines will provide a synergistic effect with respect to the threshold activity in preventing metal ion precipitation.

DETAILED DESCRIPTION OF THE INVENTION

While the methylene phosphonate of aminoethylpiperazine itself has been disclosed as not having very good threshold activity, when used in the present invention in combination with other phosphonates it, along with the polyaminoethylpiperazine phosphonates, shows a synergistic effect as a threshold agent.

The poly(aminoethylpiperazine)methylenephosphonates disclosed in our copending application Ser. No. 425,025, filed Sept. 27, 1982 now U.S. Pat. No. 4,489,203, also exhibit this synergism when used in combination with the above indicated phosphonates.

The phosphonic acid derivatives of aliphatic acids, e.g. acetic, propionic and the like, as disclosed in U.S. Pat. No. 3,214,454, are useful in the combination of the invention.

Amine methylenephosphonates which are derived from ammonia and ethylenediamines, e.g. ethylenediamine, diethylenetriamine, triethylenetetramine and the like exhibit the synergistic threshold effect when combined with the methylenephosphonates of AEP and its polymers formed by reaction with a dihalo compound.

Thus, one component of the synergistic combination can be selected from compounds having the formula

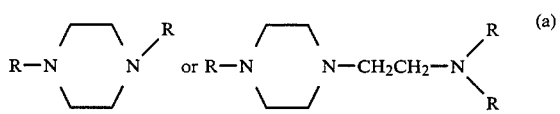

wherein R is hydrogen, hydroxyethyl, hydroxypropyl, methylenesulfonate, hydroxyethylsulfonate, hydroxypropylsulfonate, carboxymethyl or

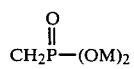

and wherein M is hydrogen, an alkali metal, an ammonium or a di- or triethanolamine radical, and wherein at least 50 percent of the R groups are

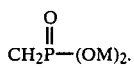

The compounds represented by the above formulas can then be combined with the (b) compounds, having the following formulas to provide the compositions of the present invention:

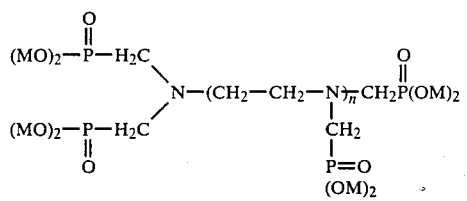
(b)

wherein n is 0–14 and wherein M has the aforesaid meaning; or

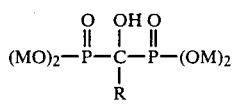

wherein R is an alkyl radical having 1–3 carbon atoms and M has the aforesaid meaning, or a polymer having the formula $A(BA)_m$ wherein A is an organic radical having the formula

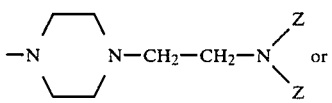

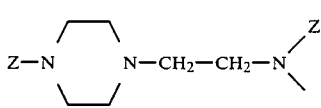

wherein Z is hydrogen, hydroxyethyl, hydroxypropyl,

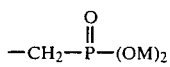

or BA and M is a H, Na or $NH_4$ radical and wherein at least 50% of the Z groups are

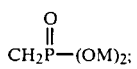

B is a moiety derived from ethylene dichloride or epichlorohydrin and m is 1 or 2. The preferred compounds of the $A(BA)_m$ formula are those which are completely phosphonated, i.e. all the Z groups are

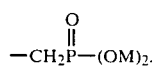

The preparation of the above polymers is fully described in our copending application referred to above and is incorporated herein by reference.

PREPARATIVE EXAMPLE

Deionized water and the amine to be phosphonomethylated were weighed into a round-bottom reaction flask equipped with a water-cooled reflux condenser, mechanical stirrer, thermometer with a temperature controller, and an addition funnel. Concentrated hydrochloric acid and phosphorous acid were added to the aqueous amine solution. The hydrochloric acid was added in an amount sufficient to provide a pH of less than 2, preferably less than 1; the phosphorous acid was added in an amount equivalent to the number of amine hydrogens it is desired to replace with the phosphonomethylene group. The reaction mixture was heated to reflux (atmospheric) and maintained at that temperature for one hour after which sufficient 37% aqueous formaldehyde was added through an addition funnel over one and one-half hours to provide an amount equivalent to the phosphorous acid added. The reaction mixture was heated at reflux for an additional 3 hours and then cooled. The product was evaluated in the following scale inhibition test.

| TEST PROCEDURE (Scale Inhibition) | | | |
|---|---|---|---|
| Solution A: | 0.02 M $CaCl_2.2H_2O$ | Solution B: | 0.04 M $NaHCO_3$ |
| | 0.48 M NaCl | | 0.48 M NaCl |
| Titrant: | 0.01 M EDTA | Indicator: | Murexide* |

*The indicator is a 0.2% solution of ammonium purpurate in ethylene glycol.

Inhibitor solutions were prepared from the compounds to be evaluated so that a solution with 1% active (as the acid) product was formed.

PROCEDURE

To a 4-ounce (118 ml) wide-mouth bottle was added 50 ml of solution A and a 1" teflon-coated magnetic stirring bar. To solution A, while stirring, was added 0.1 ml of the 1% solution of the compound to be tested. Stirring was continued for approximately one minute, then 50 ml of solution B was added and stirring continued for another three minutes. The stirring bar was removed, the bottle capped, labelled, and placed in an 80° C. oven for 24 hours. At the end of 24 hours the sample was removed from the oven and 5 ml of the liquid was extracted (avoiding particulates) and filtered through a 4-micron glass frit. To the filtered sample was added 2 ml 1N NaOH and 4 drops of 0.2% Murexide indicator solution. About 70 ml of deionized water was added and the solution titrated with 0.01M EDTA until the color changed from pink to violet.

The total calcium concentration is 0.01M after mixing 50 ml of solution A with 50 ml of solution B. If all of the calcium remains in solution during the 24-hour period at 80° C., then the concentration will still be 0.01M and this represents 100% inhibition of $CaCO_3$. Depending on the performance of the inhibitor being evaluated, some $CaCO_3$ will precipitate, leaving less soluble calcium. The titration measures the amount of soluble calcium left in solution after 24 hours at 80° C. This amount is divided by the total amount originally added and the result multiplied by 100 to obtain the percent inhibition.

EXAMPLE A (Comparative)

Aminoethylpiperazine was phosphonomethylated with formaldehyde and phosphorous acid in the presence of hydrochloric acid to give the trimethylenephosphonic acid derivative. Results of scale inhibition tests performed as above are shown in Table I and compared with a commercially available organophosphonic acid, diethylenetriaminepentamethylenephosphonic acid (DETA-PMP).

TABLE I

| Additive | Concentration** | Percent Inhibition |
| --- | --- | --- |
| AEP-TMP* | 10 ppm | 44 |
| " | 8 ppm | 41 |
| " | 2 ppm | 36 |
| DETA-PMP | 10 ppm | 70 |
| " | 2 ppm | 55 |
| " | 0.5 ppm | 34 |
| None | — | 28 |

*AEP-TMP - aminoethylpiperazinetrimethylenephosphonic acid
**ppm based on active acid The data summarized in Table I demonstrates that the aminoethylpiperazinetrimethylenephosphonic acid product is not a good scale inhibition compound when compared to the commercial product, diethylenetriaminepentamethylenephosphonic acid.

EXAMPLE 1

Different concentrations of AEP-TMP and DETA-TMP were blended together to provide a total of 10 ppm active acid and the scale inhibition properties of these combinations were determined. Results are shown in Table II.

TABLE II

| Additive (ppm)* | | Percent Inhibition |
| --- | --- | --- |
| AEP-TMP Acid | DETA-PMP Acid | |
| 10.0 | 0 | 44 |
| 9.5 | 0.5 | 56 |
| 9.0 | 1.0 | 69 |
| 8.0 | 2.0 | 81 |
| 6.0 | 4.0 | 65 |
| 5.0 | 5.0 | 57 |
| 2.5 | 7.5 | 66 |
| 0 | 10.0 | 70 |

*ppm based on active acid

It should be noted that the blends containing 50 to 95% AEP-TMP in the mixture did about as well as or better than using the DETA-PMP alone. One would not expect mixtures of the AEP-TMP (which has poor inhibition alone) with the DETA-PMP to give any inhibition approaching that of DETA-PMP itself at the same total concentration, i.e. 10 ppm. Thus, it is unexpected that inhibition of from 56 to 81% is obtained from those mixtures containing 50–95% of the AEP-TMP.

EXAMPLE 2

Different concentrations of the AEP-TMP and ethylenediaminetetramethylenephosphonic acid (EDA-TMP) were blended together and scale inhibition properties determined. Results are outlined in Table III. The synergistic effect is clearly demonstrated.

TABLE III

| Additive (ppm)* | | Percent Inhibition |
| --- | --- | --- |
| AEP-TMP Acid | EDA-TMP Acid | |
| 10.0 | 0 | 44 |
| 9.5 | 0.5 | 67 |
| 9.0 | 1.0 | 84 |
| 8.0 | 2.0 | 89 |
| 6.0 | 4.0 | 85 |
| 5.0 | 5.0 | 80 |
| 2.5 | 7.5 | 70 |
| 0 | 10.0 | 65 |

*ppm based on active acid

Again, as in Example 1, those mixtures containing 50–95% of AEP-TMP were superior to the EDA-TMP alone. That is, the mixtures of the polyamine methylenephosphonate with a piperazine methylenephosphonate provide an unexpected amount of inhibition.

EXAMPLE 3

A phosphonic acid derivative of a non-nitrogen compound, in this case a derivative of acetic acid, was employed together with the AEP-TMP. Results are shown in Table IV for various combinations of AEP-TMP with 1-hydroxyethylidene-1,1-diphosphonic acid (HE-DP).

TABLE IV

| Additive (ppm)* | | Percent Inhibition |
| --- | --- | --- |
| AEP-TMP Acid | HE-DP Acid | |
| 10.0 | 0 | 44 |
| 9.5 | 0.5 | 74 |
| 9.0 | 1.0 | 85 |
| 8.0 | 2.0 | 89 |
| 6.0 | 4.0 | 82 |
| 5.0 | 5.0 | 83 |
| 2.5 | 7.5 | 80 |
| 0 | 10.0 | 71 |

*ppm based on active acid

EXAMPLE 4

Piperazine diphosphonic acid (PDP) was blended with the DETA-PMP of Example 1 and tested for scale inhibition. Results for various mixtures are given in Table V.

TABLE V

| Additive (ppm)* | | Percent Inhibition |
| --- | --- | --- |
| PDP Acid | DETA-PMP Acid | |
| 10.0 | 0 | 24 |
| 9.5 | 0.5 | 34 |
| 9.0 | 1.0 | 54 |
| 8.0 | 2.0 | 65 |
| 6.0 | 4.0 | 77 |
| 5.0 | 5.0 | 79 |
| 2.5 | 7.5 | 74 |
| 0 | 10.0 | 70 |

*ppm based on active acid

The range of effectiveness is slightly different here, i.e. from about 25 to 80% of the piperazine derivative. Apparently the effect with the non-nitrogen compound diminished significantly above 90% and is also effective at lower percentages in the combination.

With the nitrogen-containing compounds the amount of the piperazine derivative is from about 50 to about 95% of the combination, preferably 60 to 90%.

The amount employed for inhibiting the scale formation can be from about 0.1 to about 100 ppm by weight of the treated solution of the combination inhibitor.

Preferred amounts are within the range of from about 5 to about 25 ppm and a most preferred amount is from about 10 to about 20 ppm.

We claim:

1. An improved organic phosphonic acid threshold agent for inhibiting scale formation by alkaline earth metal salts which comprises a piperazine phosphonic acid derivative having the formula

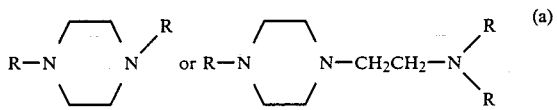 (a)

wherein R is hydrogen, hydroxyethyl, hydroxypropyl, methylenesulfonate, hydroxyethylsulfonate, hydroxypropylsulfonate, carboxymethyl or

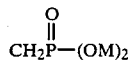

and wherein M is hydrogen, an alkali metal, an ammonium or a di- or triethanolamine radical in combination with a phosphonic acid derivative of an amine having the formula

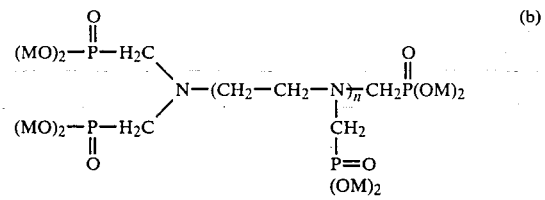 (b)

wherein n is 0–14 and wherein M has the aforesaid meaning; or an organic phosphonate derivative having the formula

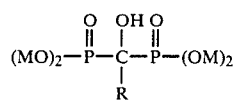

wherein R is an alkyl radical having 1–3 carbon atoms and M has the aforesaid meaning; or a polymer having the formula A$(BA)_m$ wherein A is an organic radical having the formula

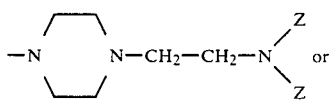

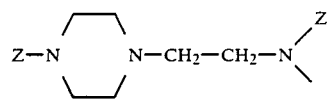

wherein Z is hydrogen, hydroxyethyl, hydroxypropyl,

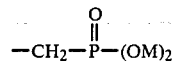

or BA and M is a H, Na or $NH_4$ radical and wherein at least 50% of the Z groups are

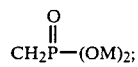

B is a moiety derived from ethylene dichloride or epichlorohydrin and m is 1 or 2, with the proviso that at least 50% of the R groups of the (a) component are

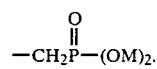

wherein the (a) component comprises from about 50 to 95% of the combination threshold agent.

2. The composition of claim 1 wherein the (a) component is piperazine dimethylenephosphonic acid or an alkali metal or ammonium salt thereof.

3. The composition of claim 1 wherein the (a) component is aminoethylpiperazinetrimethylenephosphonic acid or an alkali metal or ammonium salt thereof.

4. The composition of claim 2 wherein the (b) component is ethylenediaminetetramethylenephosphonic acid or an alkali metal or ammonium salt thereof.

5. The composition of claim 2 wherein the (b) component is diethylenetriaminepentamethylenephosphonic acid or an alkali metal or ammonium salt thereof.

6. The composition of claim 2 wherein the (b) component is 1-hydroxyethylidene-1,1-diphosphonic acid or an alkali metal or ammonium salt thereof.

7. The composition of claim 2 wherein the (b) component is A$(BA)_m$.

8. The composition of claim 3 wherein the (b) component is ethylenediaminetetramethylenephosphonic acid or an alkali metal or ammonium salt thereof.

9. The composition of claim 3 wherein the (b) component is diethylenetriaminepentamethylenephosphonic acid or an alkali metal or ammonium salt thereof.

10. The composition of claim 3 wherein the (b) component is 1-hydroxyethylidene-1,1-diphosphonic acid or an alkali metal or ammonium salt thereof.

11. The composition of claim 3 wherein the (b) component is A$(BA)_m$.

* * * * *